No. 882,833. PATENTED MAR. 24, 1908.
F. M. MUDLER.
TROLLEY HARP.
APPLICATION FILED DEC. 5, 1907.
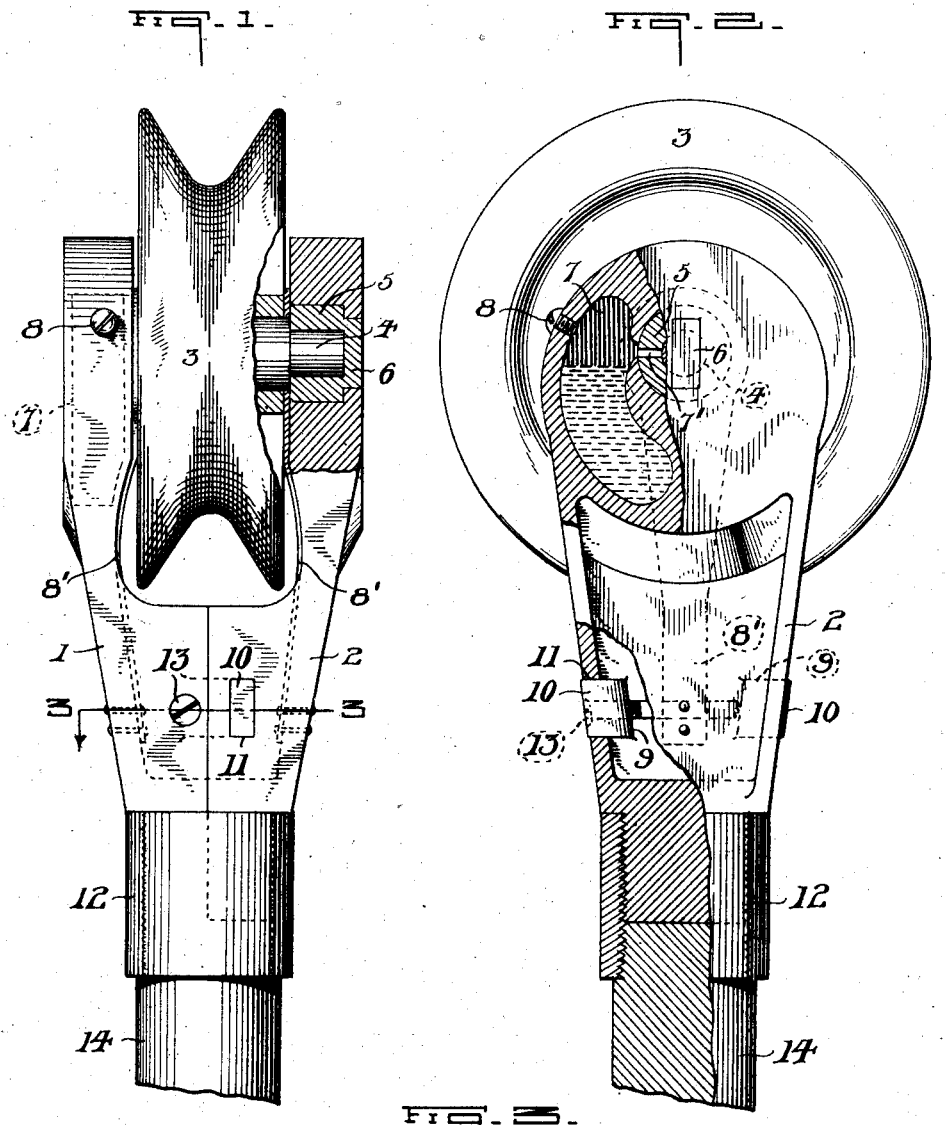
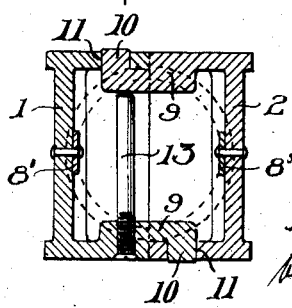
WITNESSES: INVENTOR
Frank M. Mudler
by F. N. Barber,
ATTORNEY

UNITED STATES PATENT OFFICE.

FRANK M. MUDLER, OF PITTSBURG, PENNSYLVANIA.

TROLLEY-HARP.

No. 882,833.     Specification of Letters Patent.     Patented March 24, 1908.

Application filed December 5, 1907. Serial No. 405,191.

*To all whom it may concern:*

Be it known that I, FRANK M. MUDLER, a citizen of the United States, residing at Pittsburg, in the county of Allegheny and State of Pennsylvania, have invented or discovered new and useful Improvements in Trolley-Harps, of which the following is a specification.

My invention relates to improvements in trolley harps and its objects are to provide a harp that may be quickly taken apart for repairs to itself or the trolley; that shall have readily removable bearings for the trolley axle; that will lubricate the axle without a waste of oil; and that will be securely held together when assembled.

Referring to the accompanying drawings, Figure 1 is a plan view of a trolley and harp, parts being broken away; Fig. 2, a side view partly broken away; and Fig. 3, a section on the line 3—3, Fig. 1.

On the drawings, 1 represents one section of the trolley harp and 2 the remaining section thereof.

3 is the trolley having the removable axle 4 with its ends in the removable bearings or boxes 5, one seated in each harp section. The boxes have polygonal outer ends 6 which extend to the outer surface of the harp sections to prevent the rotation of the boxes and to provide means for driving the boxes from their seats in the harp sections.

There are oil reservoirs 7 on the upper side of the sections 1 and 2. An opening 7' leads from each reservoir through the boxes 5 to the ends of the axle. The reservoirs extend well below the boxes 5 and slightly above the oil passage 7', so that the oil can splash up past the oil passage as the trolley vibrates and can run to the axle when the trolley is horizontal. Screws 8 seal the inlets to the reservoirs.

The harp sections preferably have copper brushes 8' secured thereto and bearing against the hubs of the trolley.

The sections 1 and 2 are provided with the lugs 9 which have the hooks or projections 10. The hooks in each section are insertible in the opening or slot 11 in the other section to prevent the sections from separating or producing a great strain on the coupling sleeve 12, which is threaded and works over the notched halves of the stems of the sections. The harp sections are prevented from movement tending to withdraw the hooks 10 by means of the screw 13 which passes through the upper wall of the section 1 and into engagement with the back of the hook 10, belonging to the section 2.

14 is the stud by which the harp is secured to the trolley pole in the usual manner. This stud is shown as an extension of the harp section 1.

The trolley harp is seen to be separable on a plane transverse of the axis of the trolley, so that the pressure of the trolley wire does not tend to open the sections along the axis of the trolley; that the boxes 5 have closed outer ends to prevent the escape of oil and cannot turn so as to remove the passage 7' from communication with the reservoir; that in case the boxes become worn, they may be quickly driven out and new ones inserted in their places; that in case a new axle is needed, the sections 1 and 2 can be quickly separated so as to release the trolley from its bearings; and the lubrication will be sufficient but not wasteful. The harp when assembled is a fork or open-ended device in which the trolley is journaled.

I claim—

1. In a trolley harp, a pair of slotted separable sections, one at each side of the trolley, and a projection on each section arranged to enter the slot in the other section to lock the sections together.

2. In a trolley harp, a pair of slotted separable sections, one at each side of the trolley, a projection on each section arranged to enter the slot in the other section to lock the sections together, and means for preventing the projections from withdrawal from the slots.

3. In a trolley harp, a pair of slotted separable sections, one at each side of the trolley, a projection on each section arranged to enter the slot in the other section to lock the sections together, and a screw passed through one section into engagement with the projection on the other section to prevent the sliding of one section on the other.

Signed at Pittsburg, Pennsylvania, this third day of December, 1907.

FRANK M. MUDLER.

Witnesses:
   F. N. BARBER,
   ALICE E. DUFF.